United States Patent [19]

Chyba et al.

[11] Patent Number: 4,838,530

[45] Date of Patent: Jun. 13, 1989

[54] APPARATUS FOR HANDLING LARGE HEAVY COMPONENTS OF MOTOR VEHICLES

[76] Inventors: Joseph A. Chyba, 440 Leach St., Englewood, Fla. 33533; William M. Kihlmire, 411 Golden Beach Blvd., Venice, Fla. 33595; Theodore J. Blackburn, P.O. Box 891, Nokomis, Fla. 33555

[21] Appl. No.: 175,619

[22] Filed: Mar. 28, 1988

Related U.S. Application Data

[63] Continuation of Ser. No. 861,718, May 12, 1986, abandoned.

[51] Int. Cl.$^4$ ............................................. B25B 1/22
[52] U.S. Cl. ................................ 269/15; 269/17; 269/71; 269/117; 269/296
[58] Field of Search ............... 269/15, 17, 71, 112, 269/117, 289 R, 296, 297; 254/DIG. 16

[56] References Cited

U.S. PATENT DOCUMENTS

| | | | |
|---|---|---|---|
| 2,468,884 | 5/1949 | L'Esperance et al. | 269/17 |
| 2,838,278 | 6/1958 | Johnsen | 269/17 |
| 4,010,942 | 3/1977 | Ward | 269/15 |

Primary Examiner—Frederick R. Schmidt
Assistant Examiner—Judy J. Hartman
Attorney, Agent, or Firm—Gifford, Groh, Sheridan, Sprinkle and Dolgorukov

[57] ABSTRACT

Apparatus for handling large heavy components of motor vehicles includes a movable cart having a top planar surface member and a hydraulic lift mounted to the cart. The hydraulic lift carries on the upper end portion of the smallest piston a head apparatus which includes a plurality of movable and adjustable arms with an angle member on one end of each arm. The head apparatus is adjustable to engage the contour of the component to be handled.

An adapter is mountable on the piston rod for use in handling a fuel tank containing fuel when work thereon is necessary.

Fixed to one end of the cart are supports for a sleeve that can pivot through 360 degrees. The cart also carries a tank into which fluids flow from said motor vehicle and the component.

The component to be handled, when lowered to the top planar surface, is maneuvered to a position and secured by an arcuate member that is mounted to a shaft slidable in the sleeve. The sleeve and component are rotatable through 180 degrees to a working position at which the component can be worked upon.

Reversing the steps mentioned allows the component to be re-attached to the motor vehicle.

9 Claims, 4 Drawing Sheets

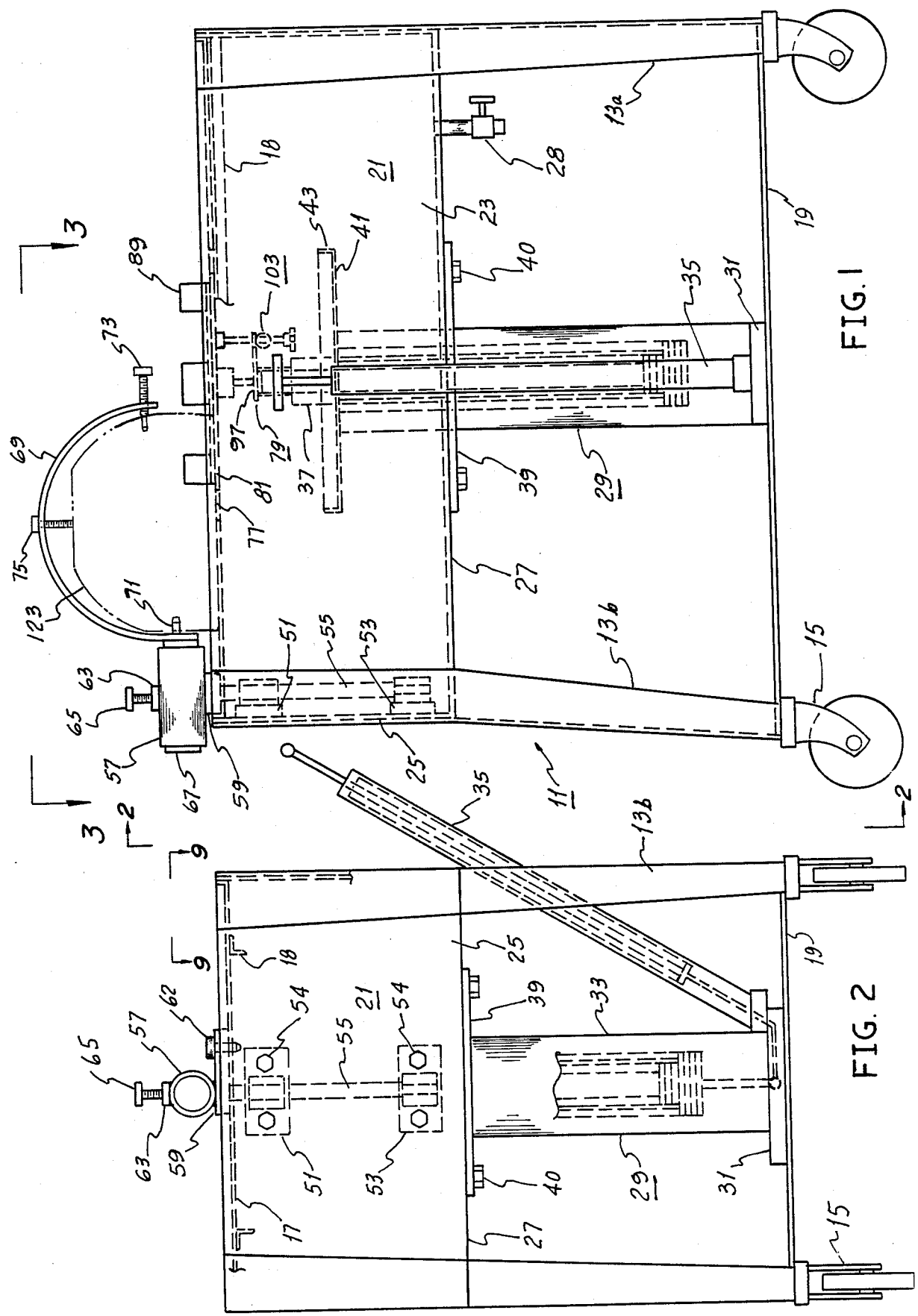

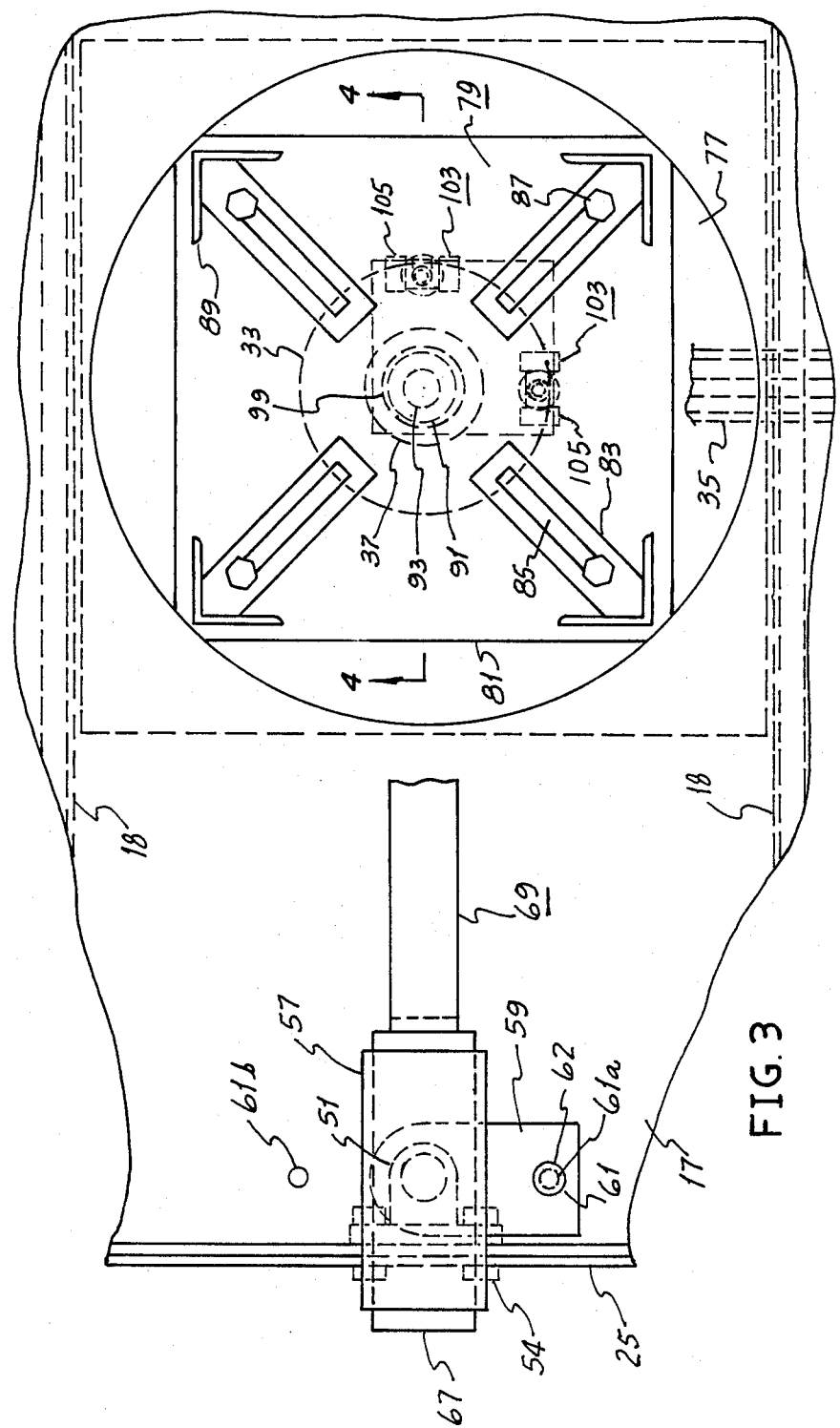
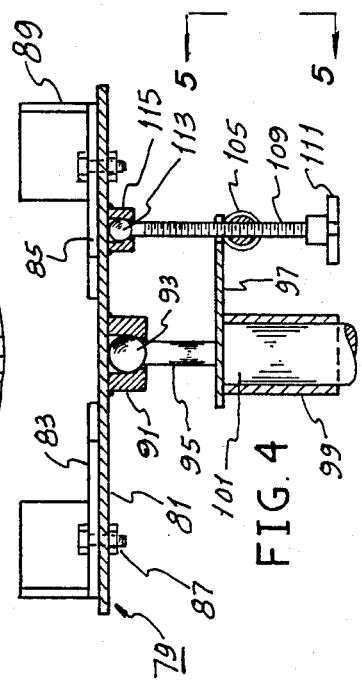
FIG.4
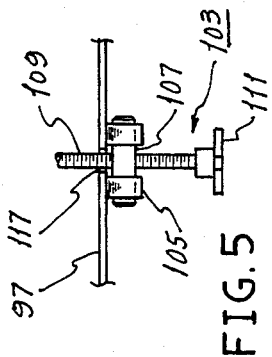
FIG.5
FIG.3

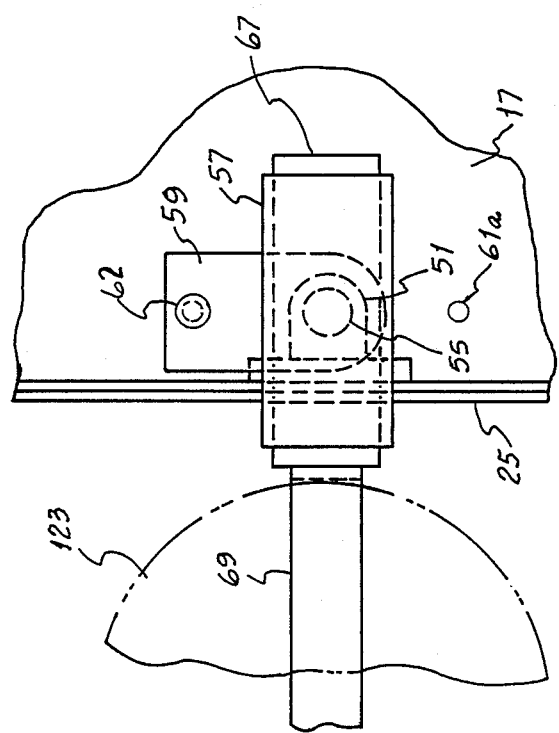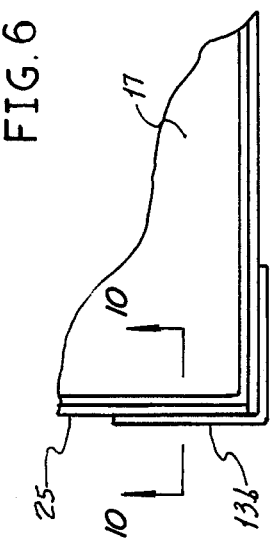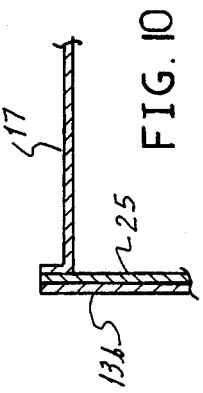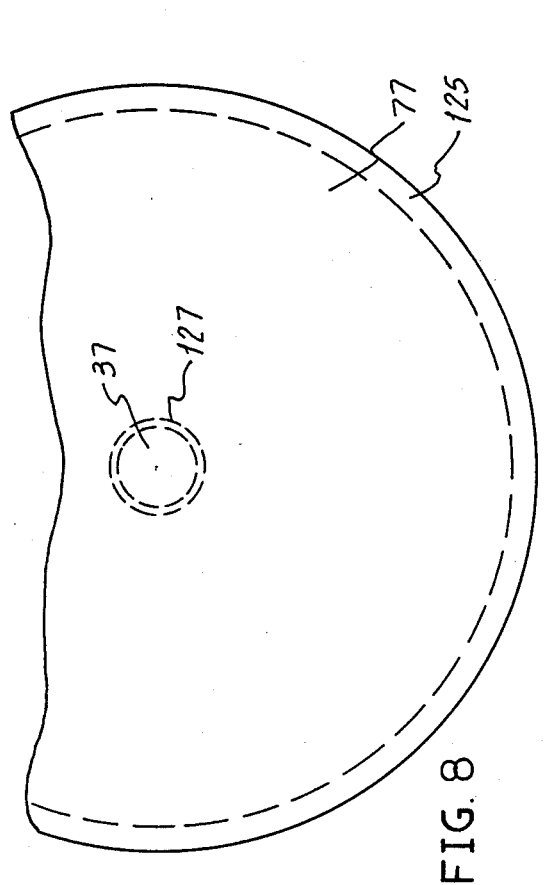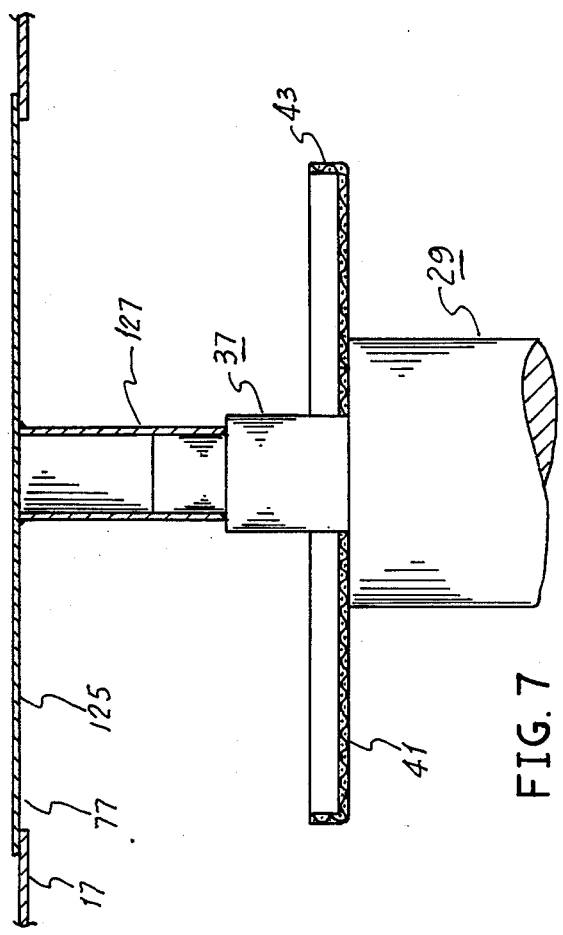

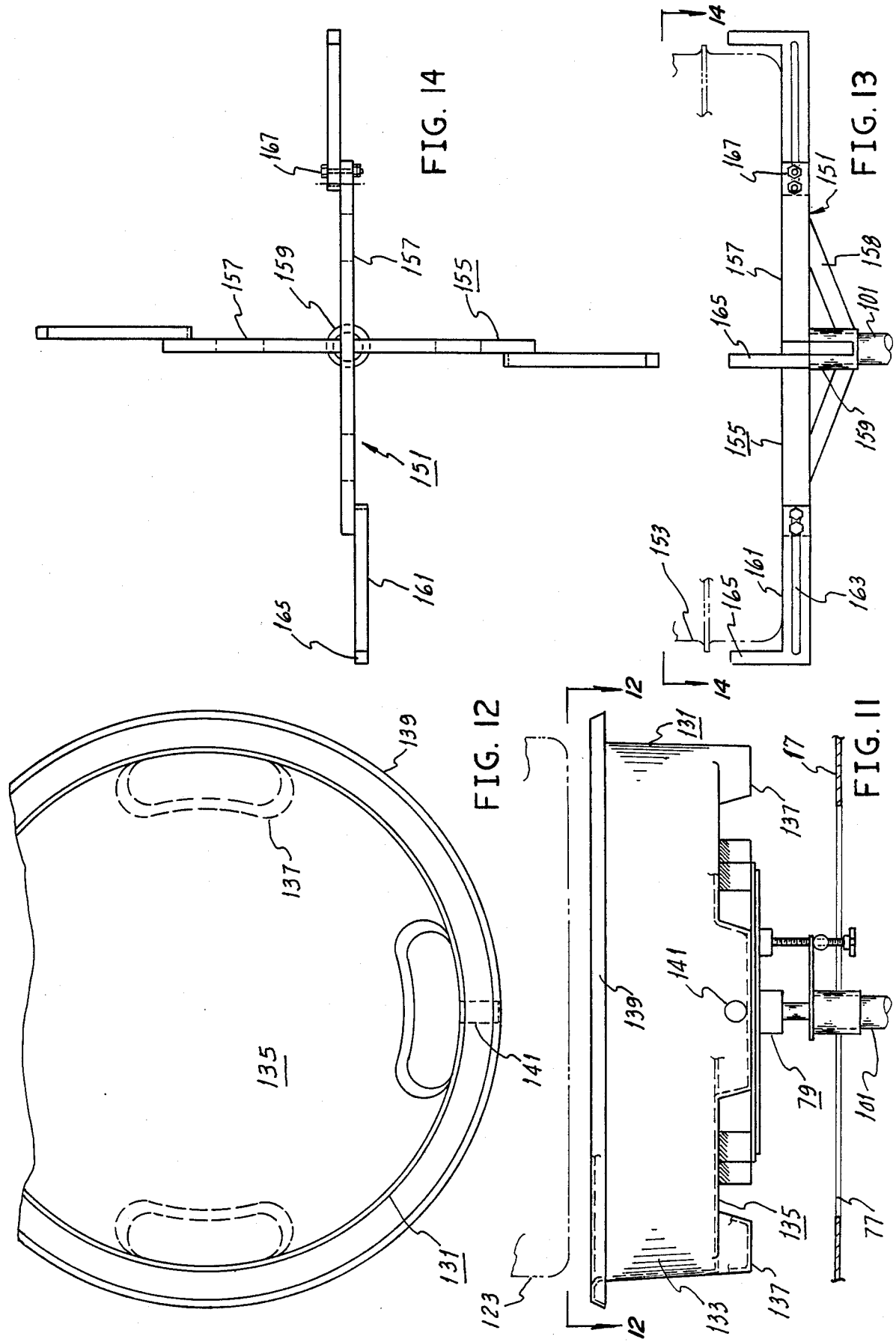

APPARATUS FOR HANDLING LARGE HEAVY COMPONENTS OF MOTOR VEHICLES

This is a continuation of co-pending application Ser. No. 861,718 filed on May 12, 1986, now abandoned.

BACKGROUND OF THE INVENTION

The present invention relates generally to motor vehicles and more particularly to devices for handling large heavy components of such vehicles, such as transmissions and the like.

From time to time it is necessary to remove a transmission device or transaxle from a motor vehicle for making repairs thereto. Such component parts of a motor vehicle are very heavy and they are cumbersome and too heavy for one mechanic to handle without auxiliary handling equipment.

The common auxiliary handling equipment includes an hydraulic jack that has a head portion onto which the transmission is secured by means of a chain or other strapping device. The transmission is lowered from the elevated position beneath the vehicle on a conventional lift and then mechanics manually place the transmission on a work table for making repairs to it.

After repairs are completed, the mechanics manually place the transmission on the head portion again, and it and the transmission are raised to reinstall the transmission in the motor vehicle.

To accomplish all of this work requires much lifting of heavy components and personal injury of the mechanics is a common work-related injury.

In contrast to the conventional method of removing, repairing and reinstalling a motor vehicle transmission, the device of the present invention obviates the need for mechanics to manually handle the transmission. Consequently, the use of the transmission handling device of the present invention will eliminate personal injury claims by mechanics who work on motor vehicle transmissions and other heavy component parts of such vehicles.

SUMMARY OF THE INVENTION

Apparatus for handling heavy component parts of a motor vehicle comprises a wheeled cart having a hydraulic lift thereon to which is removably mounted a head portion that engages such components. The head portion and lift can be lowered, while supporting the component part, to the top of the cart; the component is then maneuvered on the top to a position at which an adapter secures the component. The adapter is maneuvered into a sleeve mounted to the cart that rotates horizontally through an angle of 180 degrees, thereby bring the component to a work position beyond the confines of the cart. The sequence is thereafter repeated in reverse so that the component may then be re-attached to the motor vehicle.

For a further understanding of the invention, and for features and advantages thereof, reference may be made to the description of one embodiment of the invention and to the drawings showing such an embodiment, wherein:

FIG. 1 is a side elevation of apparatus in accordance with the present invention with a portion thereof shown in one operative position;

FIG. 2 is an end view along line 2—2 of FIG. 1;

FIG. 3 is a view along line 3—3 of FIG. 1;

FIG. 4 is a view along line 4—4 of FIG. 3;

FIG. 5 is a view along line 5—5 of FIG. 4;

FIG. 6 is a plan view of a portion of the apparatus shown in FIG. 1 in another operative position;

FIG. 7 is an elevational view of a portion of the apparatus shown in FIG. 1 with some apparatus removed;

FIG. 8 is a plan view of a portion of the structure shown in FIG. 7;

FIG. 9 is a view along line 9—9 of FIG. 2;

FIG. 10 is a view along line 10—10 of FIG. 9;

FIG. 11 is a schematic view in elevation of an oil pan portion of the invention shown in an operative position;

FIG. 12 is a plan view along line 12—12 of FIG. 11;

FIG. 13 is a schematic view of a gasoline tank handling portion of the invention shown in an operative position; and FIG. 14 is a plan view along line 14—14 of FIG. 13.

DETAILED DESCRIPTION

Referring to FIG. 1, apparatus for handling large heavy components of a motor vehicle, with particular emphasis on the handling of a transmission of a motor vehicle, comprises a cart 11 comprised of four legs 13 with casters 15 affixed at the bottom of each leg. Two rear legs 13a are straight and two front legs 13b are skewed angularly, about as shown.

The four legs 13 connect at their tops to a top planar member 17 having a flanged perimeter, and they also support a transverse planar member 19 at the bottom. As shown in FIGS. 1-3, the top plate member 17 is provided with two spaced apart angular members 18 that are affixed to the underneath side of the top plate member 17 for the purpose of stiffening the top plate member. Beneath the top planar member 17 is a tank 21 having side and end walls 23, 25 carried by the legs 13 and a bottom 27 disposed transversely and also carried by the legs 13. As shown in FIG. 1, a drain tube and valve combination 28 is connected into the bottom 27 of the tank 21.

The bottom transverse planar member 19 supports a conventional hydraulic lift 29 that has a base plate 31 mounted to the planar member 19. The hydraulic lift 29 has a tubular column 33 that is carried on the base plate 31 and that extends upwardly through the bottom 27 of the tank 21, about as shown in FIGS. 1 and 2. The hydraulic lift 29 is provided with a lever 35 that serves to pump hydraulic fluid in the lift 29 to raise a plurality of pistons 37 telescoped within the lift. Surrounding the column 33, where it passes through the bottom 27 of the tank 21, there is provided a heavy plate 39 to reinforce and strengthen the bottom 27; the plate 39 being bolted, as at 40, to the bottom 27.

The upper end of the column 33 terminates within the tank 21, some distance above the bottom 27, about as shown in FIG. 1. Supported on the top of the column 33 is a wire mesh screen 41 having an upturned, flanged periphery 43 around its perimeter. Such wire mesh screen 41 is removable from its position on top of the column 33 when necessary, as for cleaning.

Mounted on one end wall 25, carried by the skewed legs 13b and disposed within the tank 21, are two spaced apart supports 51, 53 that are bolted, or otherwise secured, to the end wall 25 by bolt and nut assemblies 54. The bottom support 53 carries the lower end of a column 55 that passes through and is journaled in the upper support 51.

Mounted on the upper end of the column 55, above the top plate member 17, is cylindrical sleeve member 57 that is carried on a plate 59. The plate 59 has an aperture 61 in it, and through it and corresponding apertures 61a in the top member 17, a pin 62 is inserted to maintain the cylindrical member in the position shown in FIG. 1. A similar aperture 61b is disposed in the top member 17 in such a location that, when the cylindrical member 57 and its base plate 59 are rotated through an angle of 180 degrees, the aperture 61 aligns with the aperture 61b and the pin 62 can be inserted therein to maintain the cylindrical member 57 and plate 59 in the position shown in FIG. 6. The cylindrical sleeve member 57 has on its top a nut 63 and a bolt 65 that is threaded in the nut 63 and through the cylindrical member 57; the bolt being used to secure a stub shaft 67 and an adapter 69.

The adapter 69 is an arcuate band encompassing about 180 degrees, as shown, and is affixed to one end of the shaft 67. The arcuate adapter includes: a pin 71 that is fixed to the adapter; and adjustable, threaded bolt 73; and a threaded bolt 75 at the top of the arcuate band.

Referring to FIGS. 1, 3-5, the top plate member 17 has a circular aperture 77 in it and through such aperture 77 passes upwardly and downwardly, when the lift 29 is activated, a head apparatus 79.

The head apparatus 79 comprises a square top plate member 81, on the top surface of which are mounted four slidable arms 83, each one of which has therein an elongate slot 85 that coacts with the shank portion of a bolt and nut assembly 87. The outer end of each arm 83 carries a short upstanding angle member 89.

The bottom of the top plate member 81 carries a socket 91 that receives a ball member 93 on the end of a rod 95 affixed to a transverse plate 97. The plate 97 is affixed to a tubular member 99 that coacts with, and is carried by, the end portion 101 of the smallest piston rod of the pistons 37. Thus, the head apparatus 79, comprising the plate member 81, the rod 95 with ball 93 coacting with socket 91 mounted to the plate 81, and the transverse plate 97 secured to tubular member 99, can easily by slipped over (as shown in FIG. 4) the end portion 101, and easily removed from the end portion 101 when necessary or desirable.

The plate member 97 extends outwardly, as shown, and is provided with a hinge arrangement 103. The hinge arrangement 103 includes two spaced apart knuckles of barrels 105, affixed to the underneath surface of the plate member 97, and a pivotable shaft or pin 107 is disposed between and journaled in the knuckles or barrels 105. The shaft or pin 107 has a threaded aperture therein into which is threaded a bolt 109 having a hand wheel 111 on its lower end and a ball 113 on its upper end. The ball 113 coacts with a socket 119 mounted to the underneath surface of the top plate member 81, about where shown.

The bolt 109 passes through a slot 117 in the outer end of the plate 97 wherefore the plate member 81 is pivotable about the ball and socket arrangement 91, 93.

In like manner, as shown in FIG. 3, a similar hinge arrangement 103 is disposed at 90 degrees from the hinge arrangement shown in FIG. 5 and described hereinbefore. This hinge arrangement is also coactive with the plate member 81 by means of a ball and socket assembly 93, 91 as described hereinbefore.

Thus, the head plate member 81 may be tilted in two directions and is adaptable to suit the contour of any heavy component to be removed from a motor vehicle. Turning the hand wheels 111 to tilt the plate member 81, as required to accommodate the component, is easily accomplished.

Referring to FIGS. 11 and 12, a pan 131 is there shown supported on the head portion 79. The pan 131 comprises four side walls 133, a bottom 135 having four external feet 137 and a sloping top perimeter 139, about as shown. In one wall 133 is an aperture 141 and an adapter with a length of hose (not shown) may be fitted to the tank. The tank is used to collect oil when a component part of a motor vehicle is a transmission 123, shown in phantom lines in FIG. 11. The oil collected in the pan 131 flows through the length of hose to the wire mesh screen 41 where any particulate matter in the oil is collected, and may be removed when necessary. The oil then collects in the tank 21 from which it is removed as is necessary.

Referring to FIGS. 13 and 14, an adapter 151 is shown there that supports a heavy component, a gasoline tank 153 for example, of a motor vehicle. The adapter 151 includes a frame structure 155 comprised of four arms 157 having braces 158 fixed to a tubular member 159 that is sized to fit onto the upper portion of the smallest piston rod 101 of the lift 29. The arms 157 are disposed radially at 90 degrees to the tubular member 159. Each arm 157 is provided with a slidable extender 161 having an elongate slot 163, and an upright end portion 165. A pair of fasteners, such as bolts and nuts 167, are located near the outward end of each arm 157 for the purpose of securing the slidable extenders 161 in position with the braces 158 against the gasoline tank 153.

In operation, a motor vehicle is first raised on a conventional lift in a repair shop or the like, to a working height above the floor of a work space. The cart 11 is then wheeled to a location beneath the component to be removed. For an example, it will be assumed first that a transmission 123 is to be removed from the vehicle and repaired or replaced.

The hydraulic lift 29 is activated thereby raising the head apparatus 79 a short distance above the top 17 of the cart 11. The pan 131, having an adapter and hose fitted to the pan 131, is then placed in position on the head portion. The lift then raises the pan 131 to a location just below the tranmission 123. As the transmission is loosened from the motor vehicle, oil in the tranmission flows into the tank 131 and thence through the adapter and hose to the screen 41 and thence into the large tank 21.

After draining the oil from the transmission, the pan 131 is removed from the head portion. The lift then raises the head portion to a location such that the arms 83, when adjusted and secured, support the transmission. The tranmission is then freed from the engine of the motor vehicle, and the lift lowers the transmission down to the table top level. The fasteners holding each arm loosened; the arms withdrawn away from the transmission 123, and the transmission 123 is easily moved toward the cylindrical member 57 mounted at the front end of the cart 11.

The adapter 69 is then placed over the transmission 123 and the one fixed pin 71 is inserted in a hole in the transmission casing. The pin 73, in like manner is inserted into another hole in the transmission casing. The threaded bolt 75 is brought into contact with the transmission 123 to secure and hold it in the adapter 69.

Then the transmission 123 and adapter 69 are maneuvered so that the shaft 67 slides into the sleeve or cylindrical member 57. Thereafter the bolt 65 is brought into contact with the shaft 67 so that it is temporarily fixed in relation to the sleeve or cylindrical member 57.

The pin 62 is then removed from holes in the plate 59 and top 17, and the plate 59 is rotated through an angle of 180 degrees to the position shown in FIG. 6. The pin 62 is placed in the hole 61b, and the transmission 123 is then suspended beyond the front edge of the cart 11. The transmission 123 is now held by the adapter 69 and shaft 67 in the cylindrical member.

In order to work on the tranmission 123, the bolt 65 is loosened allowing the shaft 67 and transmission 123 to be rotated to any desired angular position at which the bolt 65 is again tightened against the shaft 67.

After repairing the transmission, the sequence of events and steps described hereinbefore to remove the transmission, may be carried out in reverse, in order to re-attach the transmission to the vehicle.

After the transmission is re-attached to the vehicle, the lift is lowered; the head apparatus is removed and a cover plate 125 (FIGS. 7, 8) having a tubular member 127 attached to its underneath surface, fits on the top portion 101 of the lift pistons 37. The cover plate 125 is slightly larger in diameter than the aperture 77 in the top plate 17, and thereby makes the top plate 17 a work surface on the cart 11.

When a heavy component such as a fuel tank of a motor vehicle is to be removed in order to repair or replace the fuel gauges therein, the head portion 79 is removed from the piston rod 101 and the adapted 151 is placed on the piston rod as shown in FIG. 13.

The lift is activated to raise the adapter to a location just below the fuel tank 153 and the slidable extenders 161 and braces 158 of each arm 157 are brought into contact with the fuel tank 153.

The fuel tank is then freed from the motor vehicle, and the lift lowers the tank to a level that permits a mechanic to easily remove, repair or replace a fuel gauge in the tank. Thereafter, the lift raises the fuel tank upwardly for reconnection to the motor vehicle.

It is to be noted that fuel does not have to be drained from the fuel tank when the adapter of the present invention is used. Caution must be carefully observed, however, to prevent igniting of the fumes from fuel in the tank while the gauge is being repaired or replaced.

From the foregoing description of a preferred embodiment of the present invention, those skilled in the art will recognize several significant features and advantages of the invention, among which are that:

The present invention is adaptable to remove and replace several different heavy component parts of an engine of a motor vehicle;

Only one mechanic is needed to remove, repair and replace a heavy component such as a transmission;

The work to remove, repair and replace such component parts is carried out at only one location on the cart of the invention; it being not necessary to manually transfer the work piece to another location and return it to the cart again;

The cart of the present invention can be used also as a work bench for performing other work on a motor vehicle;

The present invention eliminates manually lifting heavy components by mechanics; thereby greatly reducing and practically eliminating personal injuries to such mechanics;

The work of removing, repairing and replacing heavy motor vehicle components is done by only one mechanic and sharing of work with another mechanic is eliminated;

It is not necessary to drain fuel from a fuel tank of a motor vehicle when a fuel gauge is to be repaired or replaced; and The cart of the present invention is easily and quickly maneuvered, in close quarters, beneath the component to be removed, repaired and replaced.

Having thusly described a preferred embodiment of the present invention, those skilled in the art will recognize modifications therein within the scope of the invention as defined by what is hereafter claimed.

What is claimed is:

1. Apparatus for handling heavy components of a motor vehicle when such vehicle is elevated above ground level to a servicing position comprising a movable cart having a planar top member; first support means mounted to said cart; lift means attached to the cart for raising and lowering said first support means; means on said first support means for supporting one of said components in an underlying position, in position for work to be done on said component; means accomodated by said cart for receiving fluids from said motor vehicle;

further comprising a second means for supporting said component in suspension above said planar top member, said second means including a sleeve pivotably mounted to said cart about a vertical axis; a shaft having means for grasping and holding said component; said shaft being insertable into said sleeve; means for securing said shaft within said sleeve; whereby said sleeve, said shaft, said component holding means and said component are pivotable about said vertical axis between a first position where said component overlies said planar top member, and a second position where said component does not overlie said planar top member.

2. The apparatus of claim 1 wherein said cart is supported on legs having casters thereon.

3. The apparatus of claim 1 wherein said first support means on said lift means includes a head portion removably positioned on said lift means; and adjustable means for engaging and holding said component on said head portion when said component is released from said vehicle.

4. The apparatus of claim 3 wherein said head portion is tiltable from a horizontal plane and is maintainable in selected tilted positions.

5. The apparatus of claim 1 wherein said means for grasping and holding said component includes an arcuate member fixed to said shaft and said arcuate member having means for engaging and holding said component.

6. The apparatus of claim 1 wherein said second means includes a column fixed to said sleeve; means carried by said cart for supporting said column whereby said column is rotatable through an angle of 360 degrees about a vertical axis; and means for securing said sleeve and said shaft against relative movement.

7. The apparatus of claim 1 wherein said means for raising and lowering said first support means includes an hydraulic lift comprised of several telescoping piston rods.

8. The apparatus of claim 1 wherein said grasping and holding means includes a plurality of arms that are adjustable for engaging and holding a component of said vehicle when said component is released from said vehicle.

9. Apparatus for handling heavy components of a motor vehicle when such vehicle is elevated above ground level to a servicing position comprising a movable cart having a planar top member; first support means mounted to said cart; lift means attached to the cart for raising and lowering said first support means; means on said first support means for supporting one of said components in an underlying position, in position for work to be done on said component; means accomodated by said cart for receiving fluids from said motor vehicle.;

further comprising a second means for supporting said component in suspension above said planar top member, said second means including a first member pivotably mounted to said cart about a vertical axis; a second member having means for grasping and holding said component; said first member being attachable to said second member; means for securing said second member to said first member; whereby said first member, said second member, said component holding means and said component are pivotable about said vertical axis between a first position where said component overlies said planar top member, and a second position where said component does not overlie said planar top member.

* * * * *